Figure 1:
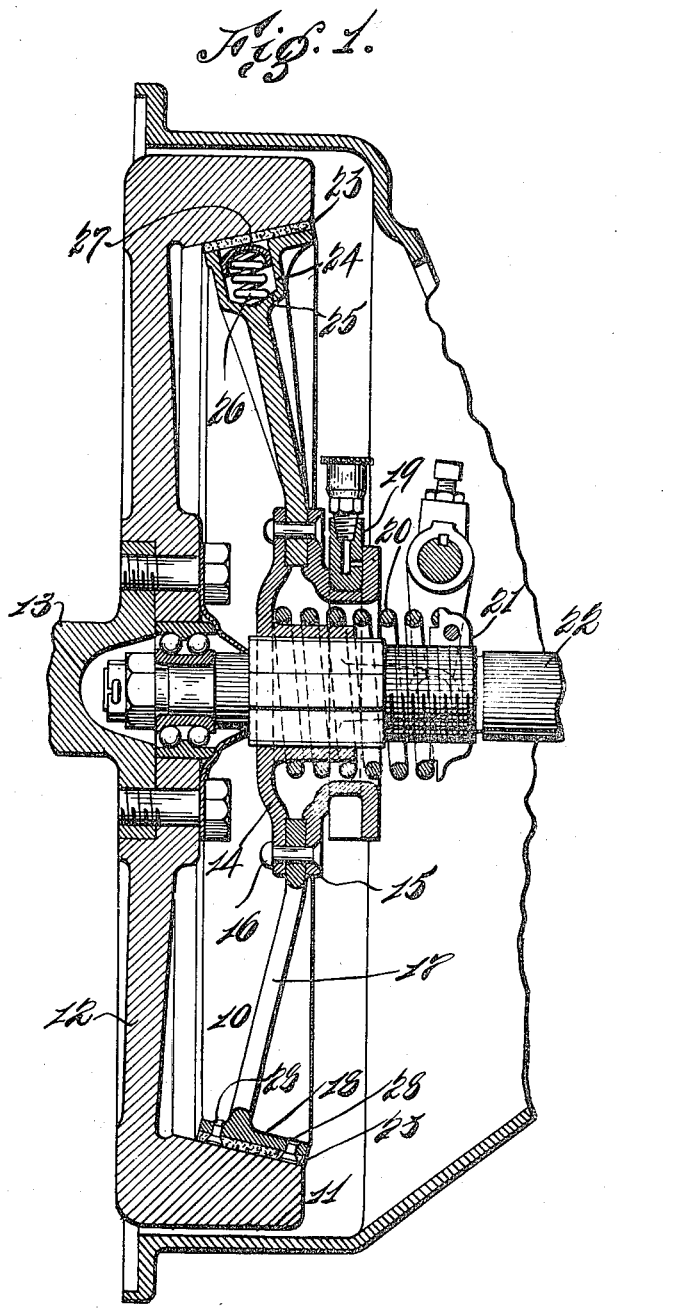

J. F. & H. E. DODGE.
FRICTION CLUTCH.
APPLICATION FILED OCT. 27, 1914.

1,141,322.

Patented June 1, 1915.
2 SHEETS—SHEET 1.

Witnesses
C. A. Jarvis
A. Bernstein

Inventors:
John F. Dodge.
Horace E. Dodge.
Newell Neal
attorneys.

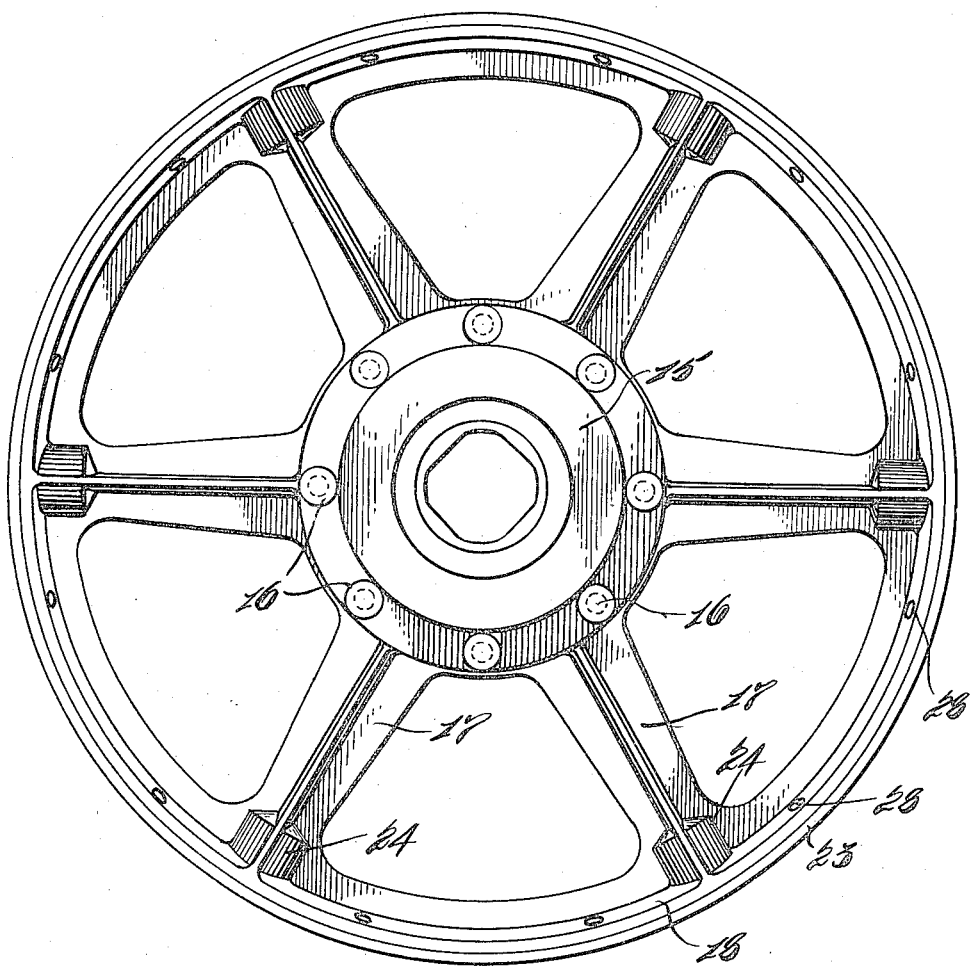
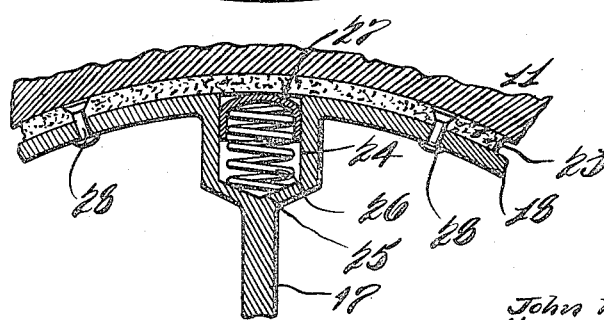

UNITED STATES PATENT OFFICE.

JOHN F. DODGE, OF DETROIT, AND HORACE E. DODGE, OF GROSSE POINT, MICHIGAN, ASSIGNORS TO DODGE BROTHERS, OF DETROIT, MICHIGAN, A CORPORATION OF MICHIGAN.

FRICTION-CLUTCH.

1,141,322.      Specification of Letters Patent.      Patented June 1, 1915.

Application filed October 27, 1914. Serial No. 868,802.

*To all whom it may concern:*

Be it known that we, JOHN F. DODGE and HORACE E. DODGE, citizens of the United States, residing at Detroit, Michigan, and Grosse Point, Michigan, respectively, have invented certain new and useful Improvements in Friction-Clutches, of which the following is a clear, full, and exact description.

This invention relates to friction clutches of the cone type such as are used for instance in connecting the motor of an automobile after it has started running with the transmission gear, in such a way that the car may be gradually accelerated and the motor at the same time pulled down in speed until the speeds of the two correspond, thus preventing shock and jar.

Some of the objects of the present invention are to provide a friction clutch which is easily manufactured and is simple and reliable and has its clutch friction qualities improved to a considerable degree.

These being among the objects of the present invention the same consists of certain features of construction and combinations of parts to be hereinafter described and then claimed with reference to the accompanying drawings illustrating a suitable embodiment of the invention in which—

Figure 1 is a diametrical section of the clutch; Fig. 2 an elevation of the inner clutch member; and Fig. 3 an enlarged detail section.

Referring to the drawings, the form of clutch shown comprises a male cone 10 and a female cone 11, which latter constitutes the rim of the fly-wheel 12 secured to the motor crank-shaft 13. The cone 10 preferably comprises hub sections 14, 15, which are secured together as by rivets 16, which also pass through the inner ends of spokes 17 which constitute the intermediate connecting portions between the hub and the rim 18. The clutch is operated in any suitable manner as by foot pedal not shown, which is connected to the male cone of the clutch by means of a clutch-shifting yoke 19, which carries a lubricator 19ª while a clutch-engaging spring 20 surrounds a portion of the hub section 14 so as to tend to press the cone 10 toward the cone 11. A thrust-piece 21 furnishes an abutment for one end of the clutch-engaging spring 20 and is screwed onto the shaft 22 which goes to the transmission. In any suitable or well known manner the hub 14, 15 may have sliding engagement with the shaft 22 and yet be compelled to turn with said shaft.

An important feature of the present invention resides in the means for providing a smooth engagement of the clutch members, to which end, portions of the flexible facing 23 of leather or the like and which is applied to the rim 18 are adapted to be raised above the normal height of the outer surface of the facing by means of springs. To this end, as shown more clearly in Fig. 3, there is located at the outer end of each of the spokes 17 a socket 24 which opens out through the rim 18, while its inner end is tapered as at 25 to constitute a seat for the inner end of a helical spring 26, which at its outer end is received within the concavity of a cup or cap 27, the skirt portion of which has sliding engagement with the socket 24. Preferably there are as many of these sockets, springs and caps as there are spokes to the cone 10, so that the outer ends of all the spokes will be provided with sockets and the described contained parts. It will be seen that as the closed ends of the spring-pressed cups or caps 27 are pressed against the flexible facing 23, the opposing portions of said facing will be pressed outwardly so that these portions will first come in contact with the engaged surface of the cone 11 when the cone 10 is pressed toward it, and the engagement will therefore be gradual, and the load will be gradually picked up without a jerk or strain on the propelling parts. Preferably the facing 23 is secured to the rim 18 at points between the spokes 17 as by rivets 28. It will be seen that the cups or caps may be readily and cheaply manufactured of sheet steel and that the closed ends thereof may be nicely rounded off so as to prevent cutting of the facing.

What we claim as new is:—

1. In a friction clutch, the combination of a clutch member having a flexible facing and provided with sockets under said facing, cups or caps guided in said sockets by means of their skirt portions, their closed ends being presented toward said facing, and helical springs located in said sockets and seated within the skirt portions of said cups or caps to press the said closed ends against said facing.

2. In a friction clutch, the combination of a clutch member having a flexible facing and provided with sockets under said facing, cups or caps guided in said sockets, and the closed ends of which are rounded off and are in contact with said facing, and helical springs located in said sockets and extending into said cups or caps to press them against said facing.

3. In a friction clutch, the combination of a clutch member having a flexible facing, and provided with sockets under said facing, the inner surfaces of the bottoms of said sockets being tapered to form seats, cups or caps guided in said sockets with their closed ends toward said facing, and helical springs located in said sockets with their inner ends centered in said seats, while their outer ends extend into said cups or caps to press them against said facing.

4. In a friction clutch, the combination of the male cone rim having a flexible facing and provided with sockets under said facing, a hub, an intermediate connecting portion or portions for said hub and said rim, said sockets terminating in said connecting portion or portions, cups or caps guided in said sockets with their closed ends toward said facing, and helical springs located in said sockets and extending into said cups or caps to press them against said facing.

5. In a friction clutch, the combination of a male cone rim, a hub, and spokes connecting said hub and rim, said rim having a flexible facing and provided with sockets which extend into the ends of said spokes, cups or caps guided in said sockets with their closed ends toward said facing, and helical springs located in said sockets and extending into said cups or caps to press them against said facing.

6. In a friction clutch, the combination of a male cone rim, a hub, and spokes connecting said hub and rim, said rim having a flexible facing and provided with sockets which extend into the ends of said spokes, the bottoms of said sockets being tapered to form seats, cups or caps guided in said sockets with their closed ends toward said facing, and helical springs located in said sockets with their inner ends centered in said seats, and extending into said cups or caps to press them against said facing.

7. In a friction clutch, the combination of a male cone rim, a hub, spokes connecting said parts, said rim having a flexible facing and being provided with sockets which extend into the ends of said spokes, so that said sockets are surrounded by the material of the said spokes themselves and open outwardly toward said facing, and spring-pressed members located in said spoke-sockets and urged against said facing.

8. In clutch mechanism, the combination of a drive-shaft, a female cone thereon, a driven-shaft, a spring-pressed male cone slidably mounted on said driven-shaft, and the rim of which is adapted to coöperate with said female cone, and means for disconnecting said male cone rim from said female cone, said male cone comprising said rim, a hub, spokes connecting said hub and rim, said rim having a flexible facing and provided with sockets under said facing which extend into the outer ends of said spokes, cups or caps guided in said sockets by means of their skirt portions and having their outer closed ends rounded off and in contact with said facing, and helical springs located in said sockets and extending within the said skirt portions to press said cups or caps against said facing.

Signed at Detroit, Michigan, this 17th day of October 1914.

JOHN F. DODGE.
HORACE E. DODGE.

Witnesses:
W. R. WILSON,
R. H. ALLEN.